July 25, 1950     C. O. KISHIBAY     2,516,124
SHIPPING CARTON FOR SENSITIVE ELECTRICAL INSTRUMENTS
Filed Feb. 27, 1946     3 Sheets-Sheet 2

July 25, 1950     C. O. KISHIBAY     2,516,124
SHIPPING CARTON FOR SENSITIVE ELECTRICAL INSTRUMENTS
Filed Feb. 27, 1946     3 Sheets-Sheet 3

Inventor
C. O. Kishibay
By M. O. Hayes
Attorney

Patented July 25, 1950

2,516,124

UNITED STATES PATENT OFFICE 2,516,124

SHIPPING CARTON FOR SENSITIVE ELECTRICAL INSTRUMENTS

Charles O. Kishibay, New York, N. Y.

Application February 27, 1946, Serial No. 650,591

8 Claims. (Cl. 206—46)

(Granted under the act of March 3, 1883, as amended April 30, 1928; 370 O. G. 757)

This invention relates to a shipping carton for packing very sensitive electrical instruments such, for instance, as the electrical meters and relays marketed commercially under the trade name of "Sensitrol." A shipping carton of the type herein disclosed is very desirable for protecting sensitive electrical instruments from damage due to vibration and shock which are encountered by the instruments when in transit. The vibrations are set up by the mode of transportation, particularly by rail transportation, and the shocks by rough handling.

It is an object of the present invention to provide a shipping carton which will effectively protect sensitive electrical instruments from damage due to vibrations and shocks encountered in transit.

Another object of the present invention is to provide a new and improved shipping carton for sensitive electrical instruments which will be of compact design and possess a high degree of isolation of the contained instrument against vibrations and shocks.

Still another object of the present invention is to provide a new and improved shipping carton for sensitive electrical instruments which is economical to manufacture, reliable in use, and which possesses the qualities of ruggedness and ease of assembly.

Other objects, advantages, and improvements will be apparent from the following description, taken in connection with the accompanying drawings, in which.

Figure 1:
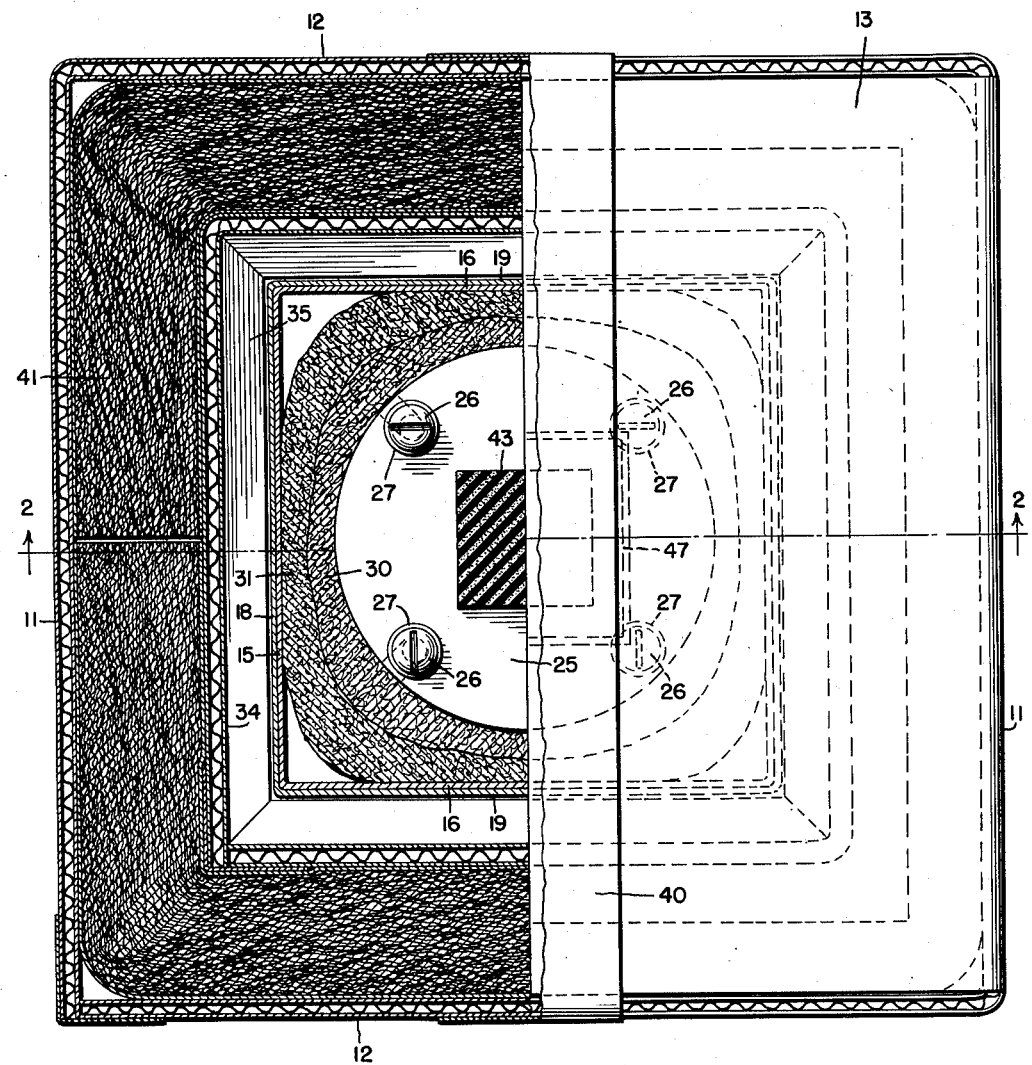
Fig. 1 is a top plan view, partly in section on the line 1—1 of Fig. 2, of the shipping carton of the present invention showing the "Sensitrol" relay in position.

The shipping carton of the present invention comprises a pair of inner and outer cardboard boxes, hereinafter referred to as the inner telescoped and outer telescoping boxes. The outer telescoping box is an ordinary double walled cardboard box with corrugated filler between the walls and has a bottom 10, pairs of side walls 11—11 and 12—12, and closure flaps 13—13. In the packed condition the closure flaps 13—13 are sealed by a band of adhesive tape 40 which is adhered to the closure flaps, side walls 12—12, and bottom 10 around one outer center line of the outer telescoped box section. The inner telescoped box comprises two box sections, one having a bottom face 14 and pairs of side walls 15—15 and 16—16, and the other having a bottom face 17 and pairs of side walls 18—18 and 19—19. The heights of the pairs of side walls 15—15 and 16—16 on the first box section and 18—18 and 19—19 on the second box section are so proportioned that the first box section will telescope within the second box section. When the first box section is encompassed within the second box section, the two are sealed together by a wide band of adhesive material 20, such as "Scotch" tape, which is adhered along one center line of the inner or first box section and extends upwardly at either end along the side walls 18—18 of the outer or second box section.

The "Sensitrol" relays, for which the shipping carton of the present invention is particularly suitable, are enclosed by a cylindrical metallic casing 21 which is closed at its bottom by a disc 22 of a phenolic condensation product, such as "Bakelite." Stud bolts with suitable nuts 28 on their outer ends pass through the cylindrical casing 21 and secure same to the bottom disc 22. Projecting through the bottom disc 22 there is a hollow cylindrical extension 23 in which the re-setting solenoid (not shown) is positioned. A cylindrical wooden block 24 has the same diameter as the relay casing 21 and an axial bore through which the cylindrical extension 23 passes, the purpose of this block being to assure that the relay will occupy a uniform cylindrical space in whatever type of device it is employed. A circular retaining plate 25 is mounted over the outer end of the cylindrical block 24. The cylindrical spacer block 24 and the relay are secured together by a plurality of stud bolts 26 which pass through the retaining plate 25, the spacer block 24, and are in threaded engagement in suitable holes in the bottom disc 22, these bolts having lock washers 27 under their heads.

Figure 2:
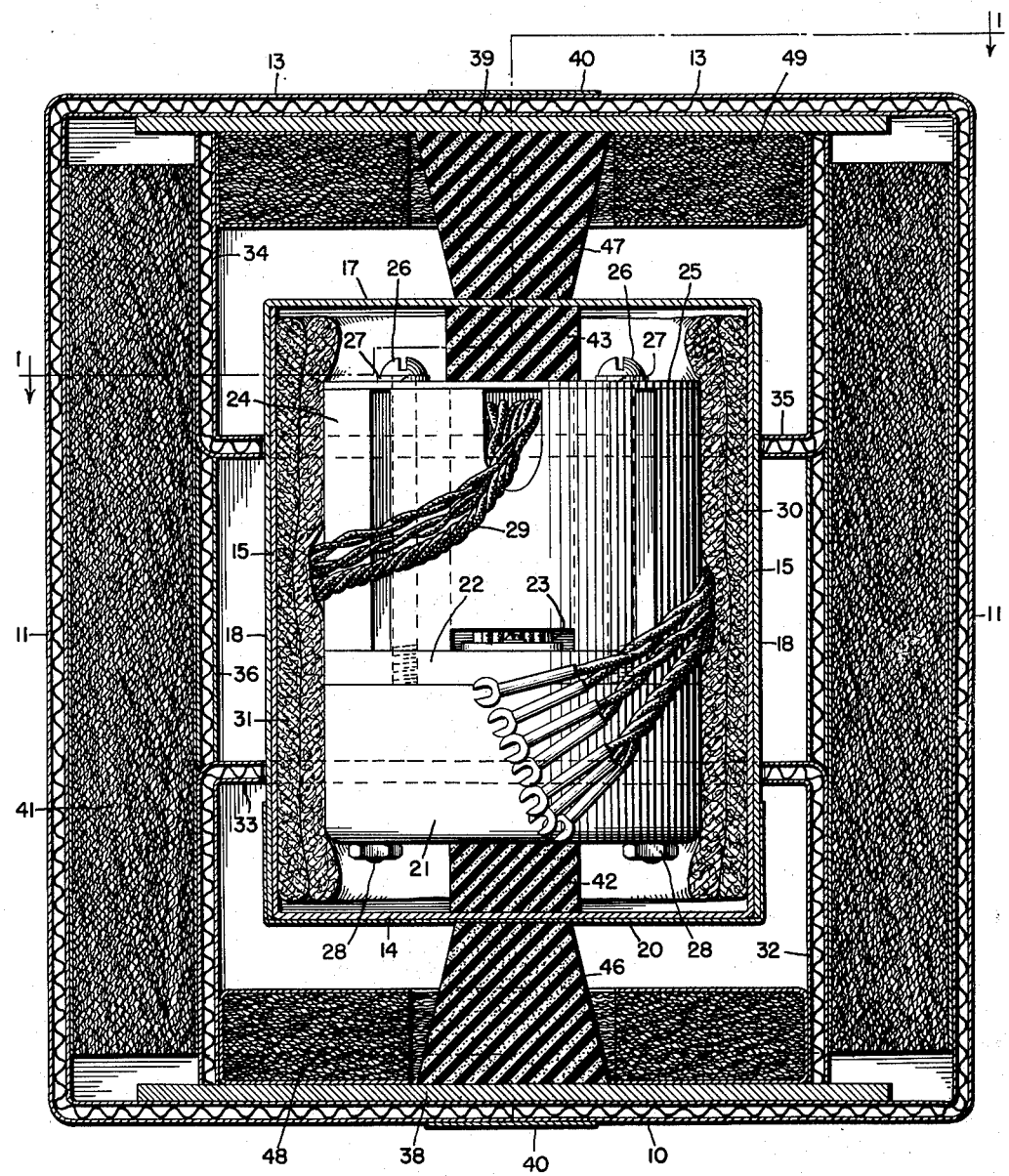
Fig. 2 is a vertical sectional view, taken on the section line 2—2 of Fig. 1.

The conductors to the relay are indicated at 29, there being seven of these, two twisted pairs and one twisted group of three. These conductors are shown wrapped around the cylindrical wooden spacer block 24 (Fig. 2) and the cylindrical metallic casing 21. Of the seven conductors, two extend to the operating electro-magnet, two to the pair of end contacts, and one to the moving needle arm of the relay, and two to the re-setting electro-magnet.

The relay and the cylindrical spacer block 24 are mounted in the first or inner telescoped box section, double layers 30 and 31 of 80 ply "Kimpak," or reclaimed cotton wadding, being interposed between the relay casing 21 and the wooden spacer block 24 and the pairs of side walls 15—15 and 16—16 of the inner or telescoped box section. The "Kimpak" wadding isolates the instrument from shock.

The encompassed inner and outer box sections are mounted in the outer or telescoping box by two sleeves 32 and 34, which have toe flanges 33 and 35, respectively, gripping the pairs of side walls 18—18 and 19—19 of the outer or second telescoped box section. A spacer 36 is interposed intermediate the toe flanges 33 and 35 on the sleeves 32 and 34, respectively. This spacer is likewise made of double walled cardboard with corrugated filler intermediate the walls. Surrounding the sleeves 32 and 34 and the spacer 36 there is a thick cushion 41 of 100 ply "Kimpak" wadding. This cushion is constructed as an elongated member and is shaped to conform to the inner perimeter of the pairs of side walls 11—11 and 12—12 of the outer telescoping box.

The sleeves 32 and 34 abut at their outer ends the end plates 38 and 39, respectively, which are preferably square plates of pressboard. The lower end plate 38 rests on the bottom 10 of the outer or telescoping box section and the upper end plate 39 is positioned under and abutted by the closure flaps 13—13 on the outer box section.

In order to take care of effects due to shock, the force due to impact must be absorbed and, in order to do this, a large area of force distribution is necessary, that is, a large area is preferable rather than a relatively large thickness of the shock absorbing material. Furthermore the coefficient of restitution of the material must be relatively low. This area is provided by the double layers 30 and 31 of "Kimpak" wadding and the "Kimpak" cushion 41. The energy that the contained instrument receives as the result of shock must be dissipated. This dissipation should be in the form of a breaking down of the relatively high frequency shock wave to one or more low frequency waves. The "Kimpak" material of the layers 30 and 31 and of the cushion 41 has the desirable characteristics and it is able to take care of the first stages of the break down; the later stages are taken care of by the top and bottom cushion members, as will hereinafter be described in greater detail.

Cushions 42 and 43 are provided for isolating the contained relay from vibrations incident to the mode of transportation. The cushions 42 and 43 are made of foam "Neoprene," 20–30 lbs. R. M. A., the cushion 42 being positioned intermediate the metallic casing 21 of the relay and the bottom 14 of the inner telescoped box section and securely cemented to the latter, and the cushion 43 being positioned intermediate the cylindrical wooden spacer block 24 and the bottom 17 of the inner telescoped box section and likewise securely cemented to the latter. The cushions 42 and 43 are preferably made of the smallest possible cross-sectional area consistent with the load to be supported (it being borne in mind that, should the outer telescoping box be inverted, the upper cushion 43 would become the supporting cushion), an area of one square inch having been found satisfactory in the present instance.

Figure 4:
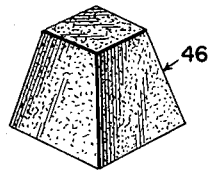
Fig. 4 is a perspective view of the preferred modification of the outer end cushions.
Figure 5:
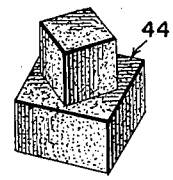
Fig. 5 is a perspective view of another modification of the outer end cushions.
Figure 6:
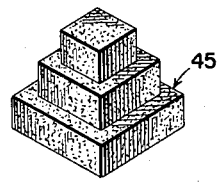
Fig. 6 is a perspective view of a third modification of the end cushions.

The inner and outer telescoped box sections are supported and isolated against vibration incident to the mode of transportation by two cushions 46 and 47. The cushions 46 and 47 are each preferably formed of foam "Neoprene," 20–25 lbs. R. M. A., and in the shape of a truncated prism of square cross section, as shown in Fig. 4. An alternative shape of cushion 44 is shown in Fig. 5 where each cushion is preferably formed as two square blocks cemented in end-to-end relationship about a common axis, the upper block having a less base dimension than the lower block, both blocks being assembled forty-five degrees with respect to each other. A second alternative shape of cushion 45 is shown in Fig. 6 where the cushions are formed of three square blocks of progressively decreasing base dimension with the lower face of the intermediate block preferably cemented to the upper face of the first block and the upper face of the intermediate block cemented to the lower face of the third block and the side faces of the three blocks disposed in parallel relationship.

The lower cushion 46, Fig. 1, abuts on its smaller base the bottom 14 of the inner telescoped box section, being aligned with the cushion 42 between the metallic casing 21 of the relay and the bottom 14 of the box section, and on its larger base is cemented to the end plate 38 on the bottom of the outer telescoping box; similarly, the upper cushion 47 abuts on its smaller base the bottom 17 of the outer telescoped box section, being aligned with the cushion 43 between the cylindrical wooden spacer block 24 and the bottom 17 of the box section, and on its larger base is cemented to the end plate 39 which underlies the closure flaps 13—13 on the outer telescoping box section. Two bumper cushions 48 and 49 are employed to absorb the longitudinal shock due to rough handling. The bumper cushions 48 and 49 are made of 80 ply "Kimpak" and are preferably square in cross section of the proper dimensions to fit snugly within the sleeves 32 and 34, respectively, and have substantially square central apertures of sufficient size to receive the larger bases of the cushions 46 and 47, respectively. The bumper cushions 48 and 49 are also cemented to the end plates 38 and 39, respectively.

The preferred embodiment of the shipping carton of the present invention has been designed in accordance with the principles of Mechanical Vibrations and Dynamics. The following relationships hold:

From vibrations, $$(1) \qquad f = \frac{1}{2\pi}\sqrt{\frac{k}{m}}$$

where $k$ = spring constant in lbs./in. and,
$m$ = mass in slugs

The above can be transformed conveniently into a more practical relationship by the suitable application of certain known relationships in "Strength of Materials"

$$(2) \qquad E = \frac{s}{e}$$

where $E$ = modulus of elasticity in lbs./sq. in.
$s$ = stress in lbs./sq. in. and,
$e$ = unit strain in inches/in.

Also, (3) $$s = \frac{P}{A}$$

where $P$ = load or weight in lbs.
$A$ = area in sq. in.

And, (4) $$e = \frac{\delta st}{t}$$

where, $\delta st$ = static deflection
and,
$t$ = thickness

Substituting (3) and (4) in (2), $$E = \frac{\frac{P}{A}}{\frac{\delta st}{t}}$$

or, $$E = \frac{\delta st}{t} = \frac{P}{A}$$

where the value of $$\frac{P}{\delta st}$$

has as its units lbs./in., which is analogous to the spring constant $k$ hence, Equation 1 becomes:

$$\frac{P}{\delta st} = \frac{EA}{t}$$

(5) $$f = \frac{1}{2\pi}\sqrt{\frac{EA}{mt}}$$

(6) $$f = \frac{1}{2\pi}\sqrt{\frac{gEA}{wt}}$$

From the foregoing equations it can be immediately seen that the area of contact between the inner telescoped box sections and the cushions 46 and 47, respectively, and the frequency of the disturbing force are related. In fact the larger this area, the higher the resonant frequency and vice versa. It follows therefore that, if the inner telescoped boxed sections are to be effectively isolated, this must be done by keeping the area of contact between same and the outer telescoping box to a minimum. The thickness of the cushions 45 and 47 between the inner telescoped box sections and the outer telescoping box must also be considered, but this dimension is limited to a cerain minimum to permit motion of the inner telescoped box sections without the occurrence of bottoming. Although the inherent damping of the system helps to reduce the amplitude of vibration, in order to reduce the ratio of natural frequency to forced frequency, the two cushions 42 and 43 intermediate the relay and the bottoms 14 and 17, respectively, of the inner telescoped box sections are used. It therefore follows that the relay and the inner telescoped box section comprise a two mass system which, when the constants are properly selected, will keep the magnification at a minimum. This is amply shown by the curves D and E of Fig. 3.

Figure 7:
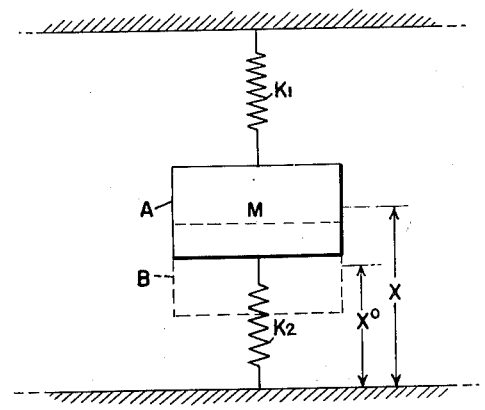
Fig. 7 is a schematic diagram illustrating the principle of longitudinal isolation of the inner telescoped or instrument containing box section.

Alternative constructions of the shipping carton are within the scope of the present invention. The resilient mounting means for the inner telescoped box sections can be positioned on two, as shown, or on four, or on six sides of the inner telescoped box sections. In the first of the latter two cases the shock absorbing "Kimpak" cushion 41 would be suitably modified to abut two opposing sides of the inner telescoped box sections and in the last case it would be omitted entirely. Also, depending upon the relative mass of the inner telescoped box sections and the instrument enclosed thereby, some other resilient isolating means, such as a helical compression or a leaf spring, could be used. The mathematical relationships existing in the case of the spring isolating means are indicated below, reference being had to Fig. 7, which is a schematic illustration of essentially the same system.

When the mass $m$ is placed on the springs $K_1$ and $K_2$, the position assumed is that of (B). The force on the springs is, neglecting damping, (1) $F = W - k_1 c + k_2 c$, where $c$ is the amount of the deflection.

When the load is applied the spring (1) deflects $(x - x_0)$ and (2) deflects $(x_0 - x)$ where, $$x_0 - x = x; \text{ and } x - x_0 = -x$$

(2) $$\therefore \frac{w}{g}\ddot{x} = W - F$$

Substituting from (1) in (2) for $F$;

$$\frac{w}{g}\ddot{x} = w - [w - k_1(-x + c) + k_2(x + c)]$$
$$= w - w + k_1 c - k_2 x - k_1 x - k_2 c$$

Since the spring constants $k_1$ and $k_2$ of the springs (1) and (2) are equal, Equation 3 reduces to:

$$\frac{w}{g}\ddot{x} = -k_1 x - k_2 x = -2kx$$

$$\therefore \frac{w}{g}\ddot{x} + 2kx = 0 \qquad \dot{x} = \frac{dx}{dt}$$

$$\ddot{x} + 2\frac{k}{m}X = 0 \qquad \ddot{x} = \frac{d^2 x}{dt^2}$$

$$\left(D^2 + 2\frac{k}{m}\right)t = 0$$

$$r^2 + 2\frac{k}{m} = 0$$

$$r^2 = -2\frac{k}{m}$$

$$r = \pm\sqrt{-2\frac{k}{m}} = i\sqrt{2\frac{k}{m}}$$

$$r = \sqrt{-2\frac{k}{m}} = i\sqrt{2\frac{k}{m}}$$

$$\therefore x = C_1 e^{+i\sqrt{\frac{k}{m}}\cdot t} + C_2 e^{-i\sqrt{\frac{k}{m}}\cdot t}$$

Using Euler's transformation, the equation becomes:

$$x = A\sin\sqrt{\frac{2k}{m}}t + B\cos\sqrt{\frac{2k}{m}}t$$

Since $$\omega = 2\pi f \text{ and } f = \frac{\omega}{2\pi}$$

this reduces, $$f = \frac{1}{2\pi}\sqrt{\frac{2k}{m}}$$

which from Equation 6 in column 5 reduced to, $$f = \frac{1}{2\pi}\sqrt{\frac{gEA(2)}{wt}}$$

Figure 3:
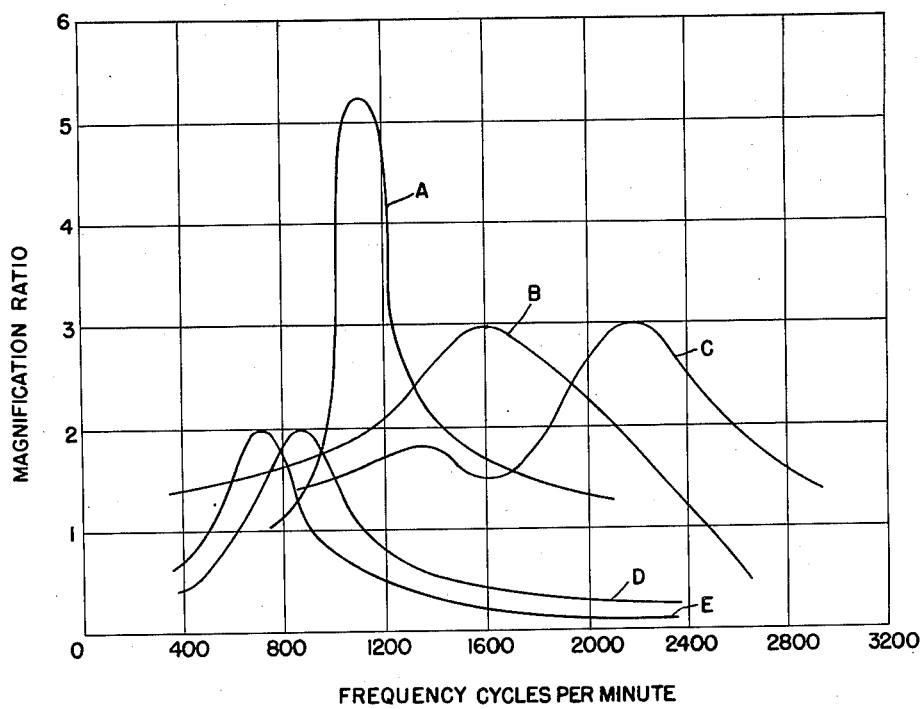
Fig. 3 illustrates a group of comparative performance curves of magnification ratios, defined herein as the ratio of the natural frequency of vibration of the contained instrument to the forced frequency applied thereto, as a function of the forced frequency of vibration.

The characteristic curves of Fig. 3 indicate the improved performance of the shipping carton of the present invention relative to that of other known shipping cartons. These curves show the magnification ratio as a function of the forced frequency of vibration for "A," a cardboard box having soft "Kimpak" packing, "B," a cardboard box with wadding, "C," a cardboard box with excelsior, while curves "D" and "E" indicate respectively the vertical and horizontal components of vibration of the subject shipping carton.

With regard to the horizontal component of vibration illustrated in curve E, for example, the frequency of these vibrations received from a railroad car traveling at 50 miles per hour over a road bed having 30 ft. rails, with the rails staggered, would be of the order of 1,400 cycles per mile, or 1,100 cycles per minute. The curve E, it will be noted, shows relatively low magnification ratio at this frequency, in contradistinction to curves A, B and C.

While there is shown and described herein a certain preferred embodiment of the invention, many other and varied forms and uses will present themselves to those versed in the art without departing from the spirit of the invention and the invention, therefore, is not limited either in structure or in use except as indicated by the terms and scope of the appended claims.

The invention herein described and claimed may be manufactured and used by or for the Government of the United States of America for governmental purposes without the payment of any royalties thereon or therefor.

What is claimed as new and desired to be secured by Letters Patent of the United States is:

1. In a shipping carton, an inner telescoped box having a longitudinal axis and adapted to receive a sensitive electrical instrument, an outer telescoping box disposed about the inner telescoped box, a layer of cushioning material of stiff characteristic positioned around the inner perimeter of the outer telescoping box, means for resiliently and slideably supporting the inner box at the lateral sides thereof within said cushioning material for movement along said axis relative to said material, and at least one pair of cushioning devices disposed along said axis at the ends, respectively, of the inner box and exteriorly thereto, the devices at each of said ends being thicker than said layer and having a pliant characteristic such that axial cushioning of the inner box is substantially more pliant than the lateral cushioning thereof.

2. In a shipping carton, an inner telescoped box adapted to receive a sensitive electrical instrument, an outer telescoping box disposed about the inner telescoped box, a layer of thick cushioning material positioned around the inner perimeter of the outer telescoping box, supporting sleeves abutting the layer of cushioning material and having integral means slideably engaging said inner telescoped box for longitudinal movement therein, and highly pliant cushioning means within said cushioning material at the ends of said inner box for absorbing the energy of vibration as the inner box slideably vibrates within said sleeves.

3. In a shipping carton, an inner telescoped box adapted to receive a sensitive electrical instrument, an outer telescoping box disposed around the inner telescoped box, a layer of thick cushioning material positioned around the inner perimeter of the outer telescoping box, a pair of opposed supporting sleeves abutting the layer of cushioning material and supporting said inner telescoped box, and means including highly pliant cushions on the axis of said sleeves for resiliently supporting said inner box for longitudinal movement within said sleeves whereby said instrument is isolated from rapid modes of longitudinal vibration to which the outer box is subjected.

4. In a shipping carton, in combination, a sensitive electrical instrument, an inner telescoped box enclosing said instrument, an outer telescoping box disposed about the inner telescoped box, resilient supporting means arranged intermediate the four side faces of the inner telescoped box and the corresponding faces of the outer telescoping box, a pair of resilient cushions positioned intermediate the electrical instrument and the end walls of the inner telescoped box, and aligned resilient supporting means arranged intermediate the end walls of the inner telescoped box and the top and bottom end faces respectively, of the telescoping box.

5. In a shipping carton, in combination, a sensitive electrical instrument, an inner telescoped box enclosing said instrument, an outer telescoping box disposed about the inner telescoped box, resilient cushions arranged intermediate the electrical instrument and the end walls of the inner telescoped box, aligned resilient supporting means arranged intermediate the end walls of the inner telescoped box and the corresponding faces of the outer telescoping box, and apertured resilient cushions secured to the said faces of the outer telescoping box and surrounding said resilient supporting means.

6. In a shipping carton, in combination, a sensitive electrical instrument, an inner telescoped box enclosing said instrument, an outer telescoping box disposed around the inner telescoped box, resilient supporting means intermediate four faces of the inner telescoped box and the corresponding faces of the outer telescoping box, resilient cushions intermediate the electrical instrument and the end walls of the inner telescoped box, aligned resilient supporting means intermediate the end walls of the inner telescoped box and the top and bottom faces, respectively, of the outer telescoping box, and apertured resilient cushions secured to the said top and bottom faces of the outer telescoping box and surrounding said resilient supporting means.

7. In a shipping container for a fragile object, an inner container constructed and arranged to enclose and support said object, means including soft packing material for absorbing lateral shocks and arranged between the sides of the object and said inner container, a pair of resilient cushion pieces arranged at the ends of the object to yieldably hold the object centrally in the inner container, an outer container constructed and arranged to enclose and support the inner container, further lateral shock absorbing means substantially filling the lateral spaces between the inner and outer containers, and a second pair of resilient cushion pieces arranged exteriorly at the ends respectively of the inner container and in alignment with the first said pair of cushion pieces for yieldably holding the inner container centrally within the outer container, said cushion pieces being of predetermined dimension and stiffness for substantially preventing endwise vibrations of said inner container having a frequency higher than a predetermined value.

8. In a shipping container, a fragile object to be shipped, an inner container for enclosing said object, resilient supporting means arranged within said inner container for said object and providing a predetermined resonant frequency of vibration of the object therein, an outer container constructed and arranged to enclose said inner container, and a second resilient supporting means interposed between said inner container and said outer container for yieldably maintaining the initial spacing therebetween in mutually perpendicular directions, said second supporting means providing a different resonant frequency of vibration of the inner container within the outer container than said predetermined resonant frequency whereby the two supported masses comprising respectively said object and said inner container are prevented from vibrating in unison.

CHARLES O. KISHIBAY.

REFERENCES CITED

The following references are of record in the file of this patent:

UNITED STATES PATENTS

| Number | Name | Date |
| --- | --- | --- |
| 1,153,185 | Allen | Sept. 14, 1915 |
| 1,457,496 | Butler | June 5, 1923 |
| 1,611,575 | Aulbach | Dec. 21, 1926 |
| 2,377,602 | Belden | June 5, 1945 |